(12) United States Patent
Yeom et al.

(10) Patent No.: US 9,740,751 B1
(45) Date of Patent: Aug. 22, 2017

(54) APPLICATION KEYWORDS

(71) Applicant: Google Inc., Mountain View, CA (US)

(72) Inventors: Jaehyun Yeom, Mountain View, CA (US); Dong Ha Lee, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/046,831

(22) Filed: Feb. 18, 2016

(51) Int. Cl.
| | |
|---|---|
| *G06F 17/27* | (2006.01) |
| *G10L 15/18* | (2013.01) |
| *G06F 17/30* | (2006.01) |
| *G10L 15/22* | (2006.01) |

(52) U.S. Cl.
CPC ...... *G06F 17/3053* (2013.01); *G06F 17/2765* (2013.01); *G10L 15/1822* (2013.01); *G10L 2015/223* (2013.01)

(58) Field of Classification Search
CPC ..... G10L 15/22; G10L 15/1822; G10L 17/22; G10L 15/1815; G10L 15/30
See application file for complete search history.

(56) References Cited

U.S. PATENT DOCUMENTS

| | | | |
|---|---|---|---|
| 5,732,395 A | 3/1998 | Silverman | |
| 6,363,348 B1 | 3/2002 | Besling et al. | |
| 6,748,361 B1 | 6/2004 | Comerford et al. | |
| 7,013,282 B2 | 3/2006 | Schrocter | |
| 7,363,228 B2 | 4/2008 | Wyss et al. | |
| 7,412,391 B2 | 8/2008 | Nakagawa et al. | |
| 7,877,258 B1 | 1/2011 | Chelba et al. | |
| 8,239,206 B1 | 8/2012 | LeBeau et al. | |
| 8,370,146 B1 | 2/2013 | Schalkwyk et al. | |
| 8,532,675 B1 | 9/2013 | Pasquero et al. | |
| 8,682,661 B1 | 3/2014 | Schalkwyk et al. | |
| 8,731,939 B1 | 5/2014 | LeBeau et al. | |
| 8,938,394 B1 * | 1/2015 | Faaborg | G06F 3/167 704/270 |

(Continued)

OTHER PUBLICATIONS

Bulyko et al. "Web Resources for Language Modeling in Conversational Speech Recognition," ACM Trans. on Speech and Language Processing, Dec. 2007, 25 pages.

(Continued)

*Primary Examiner* — Matthew Baker
(74) *Attorney, Agent, or Firm* — Fish & Richardson P.C.

(57) ABSTRACT

Methods, systems, and apparatus, including computer programs encoded on a computer storage medium, for receiving audio data corresponding to an utterance of a user, determining that at least a portion of the audio data corresponds to an action keyword, obtaining candidate applications that correspond to the action keyword, which include applications associated with a uniform resource identifier (URI) that corresponds to the action keyword, ranking the candidate applications that correspond to the action keyword based at least on: (i) a bidding weight associated with the action keyword for each of the candidate applications, and (ii) a power score associated with each of the candidate applications, identifying a highest ranked application among the candidate applications that has a URI that corresponds to at least the action keyword, and executing the URI for the highest ranked application among the candidate applications that correspond to at least the action keyword.

17 Claims, 5 Drawing Sheets

(56) References Cited

U.S. PATENT DOCUMENTS

| | | |
|---|---|---|
| 8,965,759 B2 | 2/2015 | Hershenhorn |
| 2003/0236664 A1 | 12/2003 | Sharma |
| 2007/0050191 A1* | 3/2007 | Weider .............. G06F 17/30864 704/275 |
| 2007/0094033 A1 | 4/2007 | Nagashima et al. |
| 2007/0100636 A1 | 5/2007 | Hirota et al. |
| 2008/0208585 A1 | 8/2008 | Ativanichayaphong et al. |
| 2008/0255850 A1* | 10/2008 | Cross .................. G10L 15/22 704/275 |
| 2008/0270135 A1 | 10/2008 | Goel et al. |
| 2009/0171659 A1 | 7/2009 | Pearce et al. |
| 2009/0171663 A1 | 7/2009 | Badt et al. |
| 2009/0171664 A1 | 7/2009 | Kennewick et al. |
| 2009/0216538 A1 | 8/2009 | Weinberg et al. |
| 2010/0223060 A1 | 9/2010 | Chang et al. |
| 2010/0286985 A1 | 11/2010 | Kennewick et al. |
| 2010/0312547 A1 | 12/2010 | Van Os et al. |
| 2010/0312782 A1 | 12/2010 | Li et al. |
| 2011/0054898 A1* | 3/2011 | Phillips ................ G10L 15/30 704/235 |
| 2011/0106534 A1 | 5/2011 | LeBeau et al. |
| 2011/0131045 A1 | 6/2011 | Cristo et al. |
| 2011/0144980 A1 | 6/2011 | Rysenga |
| 2011/0196668 A1 | 8/2011 | Shu et al. |
| 2011/0320307 A1* | 12/2011 | Mehta ................ G06Q 30/0282 705/26.7 |
| 2012/0173244 A1 | 7/2012 | Kwak et al. |
| 2013/0238326 A1 | 9/2013 | Kim et al. |
| 2014/0195243 A1 | 7/2014 | Cha et al. |
| 2014/0278419 A1* | 9/2014 | Bishop .................. G06F 3/16 704/249 |
| 2014/0279233 A1 | 9/2014 | Lau et al. |
| 2014/0343950 A1 | 11/2014 | Simpson et al. |
| 2015/0019074 A1 | 1/2015 | Winter et al. |
| 2016/0180853 A1* | 6/2016 | Vanlund ................ G10L 17/22 704/275 |

OTHER PUBLICATIONS

LumenVox, "Grammars," retrieved on Jul. 31, 2010, http://www.lumenvox.com/pdf/grammars.pdf, 9 pages.

Taylor, P.A. "Concept-to-Speech Synthesis by Phonological Structure Matching." Center for Speech Technology Research, University of Edinburgh; The Royal Society, 2000, 14 pages.

* cited by examiner

APPLICATION KEYWORDS

FIELD

The present specification generally relates to speech recognition.

BACKGROUND

Speech recognition is an important technology that is used in computing devices. A speech recognition service for an electronic device generally receives vocal utterances that include spoken words from a user, and transcribes the spoken words into text. Vocal utterances may include an action keyword, i.e., a predetermined reserved word that causes a system or device to perform a corresponding action or actions.

SUMMARY

Implementations of the present disclosure relate to identifying an action keyword in a voice command from a user and executing the most appropriate application for that action keyword. In some implementations, the voice command may include an action keyword that corresponds to an action to be performed by a device and an object keyword that corresponds to an object of the action to be performed by the device. For example, a command may include the phrase "Play Song A," where "Play" is the action keyword and "Song A" is the object keyword. In accordance with implementations of the present disclosure, the most appropriate application to play the song "Song A" will be executed. For example, the most appropriate application may be identified based on a combination of factors including a bidding weight, obtained from metadata associated with the application, for a particular uniform resource identifier (URI) associated with the action keyword and object keyword combination, a power score associated with the application that is based at least on a popularity metric and a rating associated with the application, and a feedback score for the URI that is based at least on a user action associated with the URI. Based on those factors, candidate applications that correspond to the action keyword and object keyword may be ranked, and the candidate application with the highest ranked application with a URI associated with the action keyword and object keyword may be executed.

One innovative aspect of the subject matter described in this specification is embodied in methods that include the actions of receiving audio data corresponding to an utterance of a user; determining that at least a portion of the audio data corresponds to an action keyword, the action keyword corresponding to an action to be performed by a device associated with the user; obtaining candidate applications that correspond to the action keyword, the candidate applications that correspond to the action keyword comprising applications associated with a URI that corresponds to the action keyword; ranking the candidate applications that correspond to the action keyword based at least on: (i) a bidding weight associated with the action keyword for each of the candidate applications, and (ii) a power score associated with each of the candidate applications; identifying a highest ranked application among the candidate applications that has a URI that corresponds to at least the action keyword; and executing the URI for the highest ranked application among the candidate applications that correspond to at least the action keyword.

In general, another aspect of the subject matter described in this specification may be embodied in methods that include the actions of determining that at least a portion of the audio data corresponds to an object keyword, the object keyword corresponding to an object of the action to be performed by the device associated with the user; and obtaining candidate applications that correspond to a combination of the action keyword and the object keyword, the candidate applications that correspond to the combination of the action keyword and the object keyword comprising applications associated with a URI that corresponds to the combination of the action keyword and the object keyword. Ranking the candidate applications may include ranking the candidate applications that correspond to the combination of the action keyword and the object keyword based at least on: (i) a bidding weight associated with the combination of the action keyword and the object keyword for each of the candidate applications, and (ii) a power score associated with each of the candidate applications. Identifying a highest ranked application among the candidate applications that has a URI that corresponds to at least the action keyword may include identifying a highest ranked application among the candidate applications that has a URI that corresponds to the combination of the action keyword and the object keyword. Executing the URI for the highest ranked application among the candidate applications that correspond to at least the action keyword may include executing the URI for the highest ranked application among the candidate applications that correspond to the combination of the action keyword and the object keyword.

Another aspect of the subject matter described in this specification may be embodied in methods that include the actions of determining at least one application, among the candidate applications, that is not installed on the device associated with the user; and removing the at least one application that is determined to not be installed on the device associated with the user from the obtained candidate applications.

These and other implementations may each optionally include one or more of the following features. For instance, the bidding weight associated with the action keyword for each of the candidate applications may be obtained from metadata associated with the application. Further, for instance, the power score associated with each of the candidate applications may be determined based at least on a popularity metric and a rating associated with the application. The popularity metric may be based on a number of downloads, a frequency of use, a user rating, a number of user reviews, a number of search queries, a number of downloads in a given time period, or the like, or any combination thereof.

According to another aspect of the subject matter described in this specification, ranking the candidate applications that correspond to the action keyword is further based at least on a feedback score for each URI that corresponds to the action keyword, the feedback score being determined for each URI based at least on a user action associated with the URI.

In some implementations, ranking the candidate applications that correspond to the action keyword may include determining a ranking score for each of the candidate applications, the ranking score being determined as a product of the bidding weight associated with the action keyword for each of the candidate applications, the power score associated with each of the candidate applications, and the feedback score for each URI that corresponds to the action keyword.

According to another aspect of the subject matter described in this specification, the bidding weight associated with the action keyword for each of the candidate applications is normalized for each of the candidate applications to generate a normalized bidding weight associated with the action keyword for each of the candidate applications, and the bidding weight on which the ranking is based comprises the normalized bidding weight associated with the action keyword for each of the candidate applications.

In general, another aspect of the subject matter described in this specification may be embodied in methods that include the actions of, for each of multiple candidate applications: determining a power score based at least on a popularity metric and a rating associated with the application; obtaining a bidding weight associated with: (i) an action keyword and (ii) a uniform resource identifier (URI) corresponding to the action keyword for the application, wherein the action keyword corresponds to an action to be performed by a device; and determining a feedback score for each URI corresponding to the action keyword for the application. The actions may further include ranking the candidate applications and the respective URIs associated with the candidate applications that correspond to the action keyword based at least on the power score, the bidding weight, and the feedback score; and providing, for execution, the URI for a highest ranked application among the candidate applications that corresponds to the action keyword.

According to another aspect of the subject matter described in this specification, the bidding weight is further associated with an object keyword, the object keyword corresponding to an object of the action to be performed by the device, and the URI corresponds to a combination of the action keyword and the object keyword.

In some implementations, the bidding weight associated with the action keyword for each of the candidate applications is obtained from metadata associated with the application.

According to another aspect of the subject matter described in this specification, the feedback score is determined for each URI based at least on a user action associated with the URI.

Other implementations of these aspects include corresponding systems, apparatus, and computer programs, configured to perform the actions of the methods, encoded on computer storage devices.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
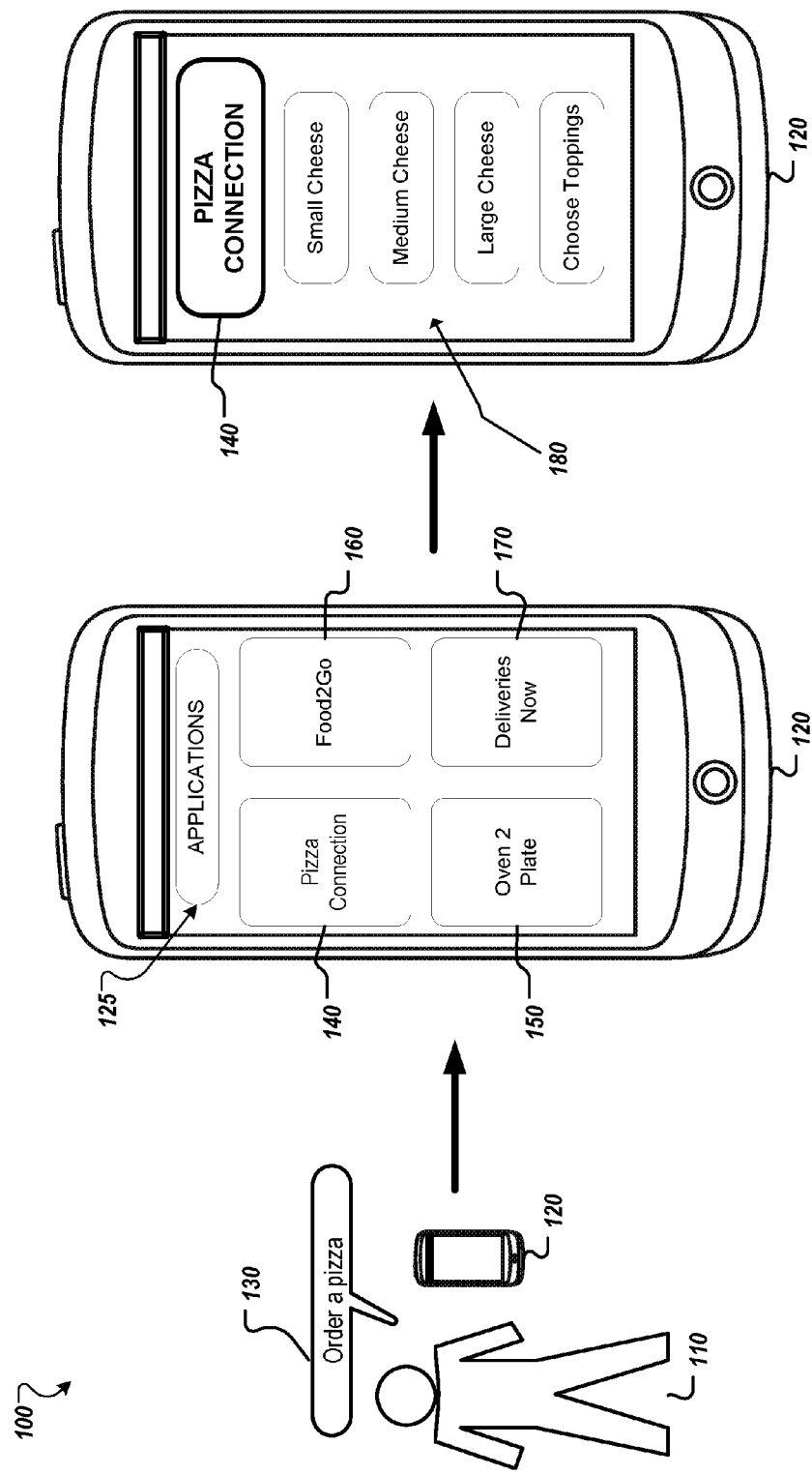
FIG. 1 depicts an example system for recognizing a keyword and executing an application, according to certain implementations.

FIG. 1 depicts an example system 100 for recognizing a keyword and executing an application, according to certain implementations.

A client device, e.g., a mobile device 120 may have applications stored thereon that can perform various actions for the user 110 of the mobile device 120. Mobile device 120 may perform certain actions with voice commands. For example, a voice command system or service for mobile device 120 may have a text message send action, and third party applications using text message may implement those actions. Further, for example, there may be actions associated with other applications, like a reading application, for which there could be more voice command actions, such as "Open Book 1" to open a purchased book on the mobile device 120, or a voice command such as "Listen to Book 1" to start a text-to-speech reading or audio book.

Each third party application may prefer certain keywords to trigger actions associated with their applications and may want to give certain keywords a higher priority. For example, applications related to movies may prefer queries or commands such as "Watch random movies," "Watch Movie A," or the like. Further, for example, applications related to finances may prefer queries or commands such as "Show me my performance," "Stock price for Stock A," or the like. In addition, for example, applications related to ride requests may prefer queries or commands such as "Call a taxi," "Call a ride," or the like. Moreover, for example, applications related to food delivery may prefer queries or commands such as "Order a pizza", "Deliver Chinese food," or the like. Those queries and commands may have a higher priority to the developers of each of those respective types of third party applications.

According to implementations described herein, the relevant application for a particular query or command may be identified from the applications installed on the client device to perform the action associated with the query or command. Each third party application may identify keywords that trigger actions associated with their application.

For example, third party applications may have bidding power according to a ranking score associated with the application, which can be based, for example, on the number of users, number of recent downloads, usage statistics, ratings, a trust level, combination of other metrics, or the like, or any combination thereof.

The applications may use their bidding power to assign a bidding weight to each query or command that they prefer to be associated with the application. For example, each application may export metadata that identifies a list of an action keyword, an object keyword, a bidding weight, and a deep link. This data is not limited to being metadata, and may be obtained in different forms. Examples of action keywords are "make a reservation," "listen," "call," etc. Examples of object keywords are "Book 1", "Song A," etc. Thus, the data from a particular application may include [AK1, OK1, B1, D1] and [AK2, OK2, B2, D2], where AK is action keyword, OK is object keyword, B is bidding weight, and D is deep link. The deep link is an example of a uniform resource identifier (URI), which, when executed, may launch the application to a particular location, menu, user interface, or the like. Each deep link may have multiple action keywords and multiple object keywords associated with the deep link.

One advantage of implementations of the present disclosure is identifying which deep link is the best or highest ranked to be executed for a given command. Thus, for example, the most relevant application may be identified and launched to perform the action associated with the command, without additional user interaction required to select the application.

Referring to FIG. 1, the user 110 may give the voice command: "Order a pizza" 130 that is received at the mobile device 120. The mobile device 120 may have several applications 125 installed and multiple applications may be related to pizza, food delivery, cooking, restaurants, or the like. For example, mobile device 120 may have Pizza Connection 140, Oven 2 Plate 150, Food2Go 160, and Deliveries Now 170 as installed applications 125. Based on, for example, a product of a base score associated with each application and a bidding weight assigned to a deep link associated with the action keyword "Order" and the object keyword "a pizza," the deep links associated with the candidate applications Pizza Connection 140, Oven 2 Plate 150, Food2Go 160, and Deliveries Now 170 may be ranked. A highest ranked application of those candidate applications that has a deep link that corresponds to the combination of action keyword "Order" and object keyword "a pizza" may be identified. The identified deep link may be executed. For example, candidate application Pizza Connection 140 may be identified as highest ranked and the deep link may be executed to launch or open Pizza Connection 140 to a pizza ordering user interface 180.

For example, the deep link for pizza ordering user interface 180 of Pizza Connection 140 may have a score indicating that, for the action keyword "Order" with the object keyword "a pizza," Pizza Connection 140 is preferred over Oven 2 Plate 150, Food2Go 160, and Deliveries Now 170. Thus, in response to the user's 110 voice command "Order a pizza" 130, the mobile device 120 may launch or open Pizza Connection 140, which may allow the user 110 to order a pizza, without requiring further input from the user 110 to select which of the candidate applications to launch or open to perform the action.

To rank candidate applications, the system may perform certain calculations or determinations. For example, for each application, a base score may be determined based on, for example, a popularity metric, a rating, or the like, or any combination thereof. According to certain implementations, a base score is determined for a particular application as the sum of the log of the number of downloads and a product of a rating for the application and a rating constant. For each action keyword or each action keyword and object keyword combination with an associated deep link, a bidding weight may be obtained. The bidding weights obtained from each application may be normalized and a ranking score may be determined based on the product of the base score and the bidding weight for each action keyword, object keyword, and deep link combination. For example, a particular application may have metadata indicating as [Action Keyword (AK), Object Keyword (OK), Bidding Weight, Deep Link (DL)] the following: [AK1, OK1, 10, D1], [AK1, OK2, 30, D2], and [AK2, OK2, 60, D2], which may be normalized to [AK1, OK1, 0.1, D1], [AK1, OK2, 0.3, D2], and [AK2, OK2, 0.6, D2], where AK1 is a first action keyword, AK2 is a second action keyword, OK1 is a first object keyword, OK2 is a second object keyword, D1 is a first deep link, and D2 is a second deep link. The base score for that particular application may be multiplied by the respective normalized bidding weights. For example, if the base score for the particular application is 0.2, the data becomes [AK1, OK1, 0.02, D1], [AK1, OK2, 0.06, D2], and [AK2, OK2, 0.12, D2].

In certain implementations, a feedback score associated with respective deep links may also be used in determining the ranking score. For example, a default feedback score may be 1.0 and the feedback score may be decreased if a user or the user's actions indicate that the action triggered is not desirable in response to the voice command. This negative indication may be determined, for example, from an action confirmation and cancel ratio, a click-through rate, actions following the triggered action, or the like, or any combination thereof. Similarly, the feedback score may be increased if a user or the user's actions indicate that the action triggered is desirable. Thus, for example, if the feedback score for the particular application is [AK1, OK1, 1.5, D1], [AK1, OK2, 1.0, D2], and [AK2, OK2, 0.5, D2], then the product of the feedback score and ranking score from above is calculated and the data becomes [AK1, OK1, 0.03, D1], [AK1, OK2, 0.06, D2], and [AK2, OK2, 0.06, D2]. This data for each application may be stored or data for all applications may be merged and stored according to action keyword or action keyword and object keyword combinations.

When a query is requested, semantic parsing of the query may be conducted to determine the action keyword and object keyword, if present. For example, a semantic query analysis technique may be used to find action keywords and object keywords from voice data. In certain implementations, there may not be an object keyword, and only an action keyword may be identified. In certain implementations, an object keyword may be inferred from the action keyword, such as inferring the current location of the client device as the object keyword. In certain implementations, bidding weights and feedback scores may be associated with an action keyword without an object keyword.

The system may determine applications that correspond to the action keyword as candidate applications. For example, for a given action keyword or action keyword and object keyword combination, the system may identify corresponding deep links from the stored data, e.g., from a database. The deep links associated with applications that are not installed on the client device may be filtered out and the corresponding candidate applications may be eliminated as candidate applications.

In certain implementations, a highest ranked application is identified from the candidate applications and a deep link associated with that highest ranked application is executed. If it is determined that the highest ranked application does not have a deep link the corresponds to the action keyword or the action keyword and object keyword combination, then the next highest ranked application with a deep link that corresponds to the action keyword or the action keyword and object keyword combination may be identified, and that deep link for the next highest ranked application may be executed.

Figure 2:
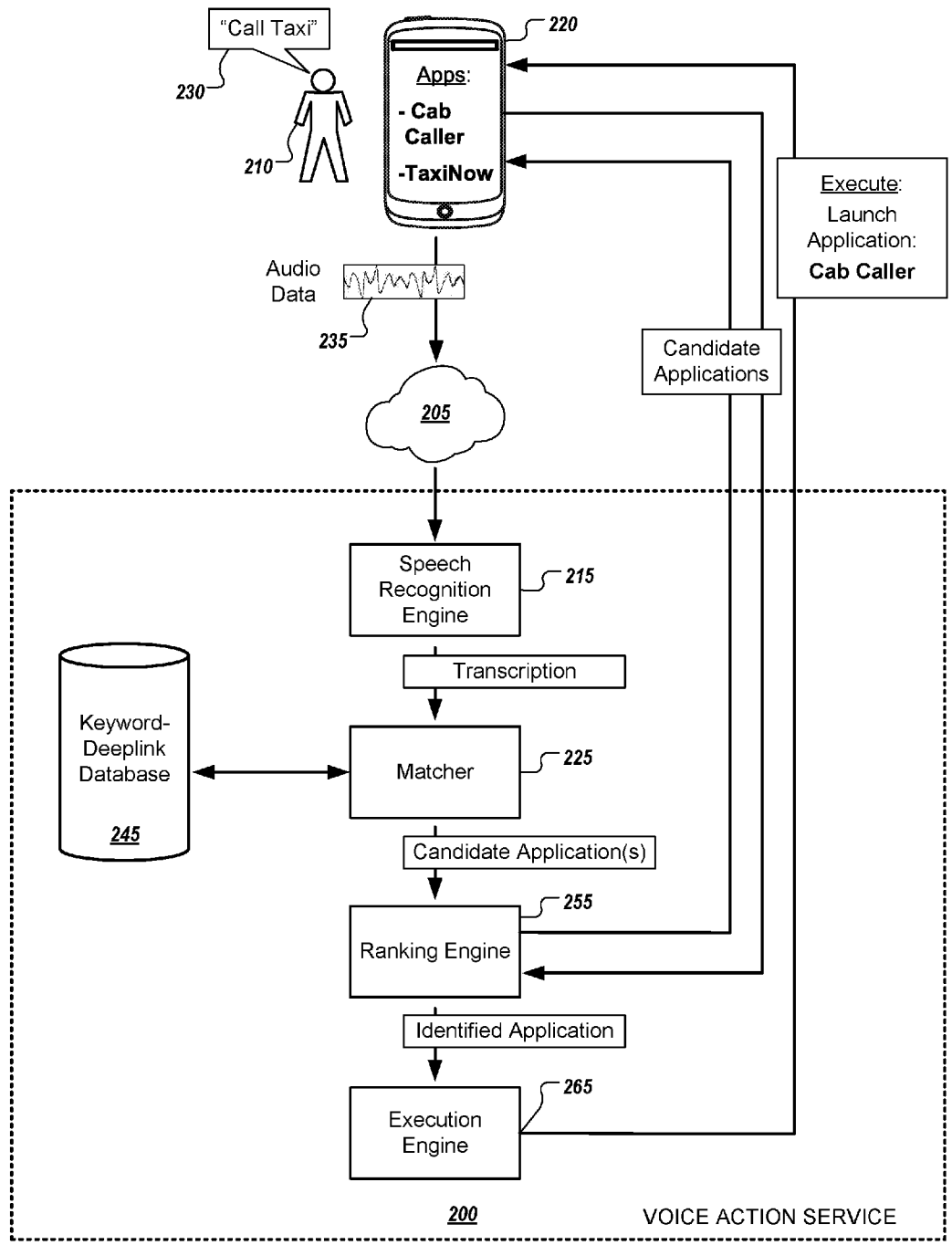
FIG. 2 depicts an example system for using a voice actions system and service to recognize a keyword and execute an application, according to certain implementations.

FIG. 2 depicts an example case of using a voice actions system and service 200 to recognize a keyword and execute an application, according to certain implementations. For example, a voice input may be matched to a keyword or combination of keywords stored by a keyword-deep-link database 245. Matching the voice input to the keyword or combination of keywords causes a deep link specified by the keyword or combination of keywords to be executed on or by an application at a user's client device 220, where the application is specified according to the keyword or combination of keywords and the deep link.

As shown in FIG. 2, the voice action service system 200 includes a speech recognition engine 215, a matcher 225, a ranking engine 255, and an execution engine 265. The speech recognition engine 215 may receive audio data 235 over one or more wired or wireless networks 205 that may include a voice input from a user 210 of a client device 220. For example, the user 210 may provide a voice input to a voice interface application hosted on the client device 220, and the voice interface application hosted on the client device 220 may transmit audio data that includes the voice input to the voice action service system 200 over the one or more networks 205. While shown as separate from client device 220 in FIG. 2, in certain embodiments one or more of speech recognition engine 215, matcher 225, ranking engine 255, and execution engine 265, as well as other systems and subsystems discussed herein, may alternatively be implemented or form a part of the client device 220 associated with the user 210.

In some instances, the speech recognition engine 215 may have access to one or more types that are defined by the voice action service system 200. For example, the voice action service system 200 may have access to one or more knowledge bases that identify entities such as people, places, items of content such as movies or songs, or other defined types or contexts. The speech recognition engine 215 or other components of the voice action service system 200 may access the one or more knowledge bases when performing speech recognition on the audio data 235 or when performing other operations relating the selection and execution of an intent based on a user's voice input.

The matcher 225 may have access to a keyword-deep-link database 245 that may include one or more keyword-deep-link combinations that have been generated based on grammars submitted by application developers. For example, keywords stored at the keyword-deep-link database 245 may include keywords for activities performed by the operating system, such as activities to restart or lock a device, join a wireless network, etc., or activities performed by the operating system that pertain to one or more applications, such as activities to launch a messaging, telephone, or email application, or the like, or any combination thereof. The keywords may include an action keyword. The keywords may further include an object keyword that is the object of a respective action keyword. Thus, action keyword-object keyword combinations may be stored at the keyword-deep-link database 245.

As shown in FIG. 2, the user 210 may have a client device 220 that is capable of receiving voice inputs, such as voice commands provided by the user 210 to perform one or more actions. In some instances, the client device 220 includes a microphone or other device for obtaining voice inputs from a user, and an operating system or application running on the client device 220 may include software for receiving voice inputs. The client device 220 may receive a voice input from the user 210, such as the voice input "Call taxi." Based on the client device 220 receiving the voice input, the client device can transmit audio data 235 that includes the voice input over the one or more networks 205 to the voice action service system 200.

The speech recognition engine 215 of the voice action service system 200 may receive the audio data 235 and perform speech recognition processing on the audio data 235 to obtain a transcription of the voice input included in the audio data 235. For example, the speech recognition engine 215 may receive the audio data 235 and may optionally filter the audio data 235 to remove noise or background audio from the audio data 235 and generate a clean version of the audio data 235. The speech recognition engine 215 may then perform speech recognition processing on the clean version of the audio data 235 to obtain a transcription of the voice input. For example, the speech recognition engine 215 may generate the transcription "Call taxi" from the audio data 235 received from the client device 220.

The speech recognition engine 215 may provide the transcription of the audio data 235 to the matcher 225. The matcher 225 may match the transcription against one or more keywords or combination of keywords that are specified by the keywords stored at the keyword-deep-link database 245. In some instances, determining that the transcription matches a particular keyword or combination of keywords may involve determining that at least a portion of the transcription matches the particular keyword or combination of keywords, such as determining that one or more terms of the transcription match one or more terms of the particular keyword or combination of keywords. Therefore, a particular transcription may be determined as potentially calling upon multiple keywords or combinations of keywords, such that the voice action service system 200 must determine a particular keyword or combination of keywords to select from among the candidate keywords or combinations of keywords. Based on determining that the transcription matches one or more keywords or combinations of keywords specified by one or more candidate keywords or combinations of keywords, the matcher 220 may provide information to the ranking engine 255 that indicates the one or more keywords or combinations of keywords.

In some instances, the user 210 may provide a textual input to the client device 220, such that the textual input may be provided directly to the matcher 225 without being provided to the speech recognition engine 215. The matcher 225 may receive the textual input and may perform the matching operations discussed above to identify one or more keywords or combinations of keywords based on the textual input. In some instances, the matcher 225 may be capable of identifying types or other features, such as arguments, that are included in the textual input.

In some implementations, the matcher 225 may expand the transcription of the audio data 235 to generate one or more related transcriptions of the audio data 235. For example, the transcription "Call taxi" may be expanded using one or more query term expansion rules, synonym rules, term optionalization rules, or other rules to generate the related transcriptions "Call a taxi," "Request a cab," "Hail a car," etc. The matcher 225 may match one or more of the related transcriptions to keywords or combinations of keywords stored at the keyword-deep-link database 245 to determine a keyword or combination of keywords that the transcription or a related transcription matches.

In certain implementations, each of the keywords or combinations of keywords stored at the keyword-deep-link database 245 are associated with a deep link or other URI that links to a specific location within an application or that launches the application. For example, respective entries in the keyword-deep-link database 245 may include an action keyword, an object keyword, and a deep link corresponding to the action keyword and object keyword combination, with the deep link being associated with a particular application. Thus, one or more candidate applications for the keyword or combination of keywords that the transcription matches may be identified.

The ranking engine 255 may receive information specifying the one or more candidate applications with the respective associated deep link, and may perform operations to rank and identify a particular deep link to be executed from among the candidate applications having respective candidate deep links. The ranking engine 255 may identify the particular deep link corresponding to the particular application to execute from among the candidate applications based on information accessed at the keyword-deep-link database 245, based on a power score associated with each of the candidate applications that may be based at least on a popularity metric and a rating associated with the application, based on a bidding weight associated with a keyword-deep-link combination, based on a feedback score associated with a keyword-deep-link combination that may be based at least on a user action associated with the deep link, based on information from the client device 220 such as applications installed on client device 220, or based on other information, or any combination thereof.

For example, the voice action service system 200 may receive or be capable of receiving information that identifies the user 210 or the client device 220 being used by the user 210, for example, based on the user 210 being logged into a particular application that is hosted by the client device 220, based on the client device 220 submitting information identifying the user 210 or the client device 220 to the voice action service system 200. The voice action service system 200 may identify the user 210 or the client device 220 based on this identifying information and may access information that specifies applications accessible to the user 210 or installed on the client device 220.

The ranking engine 255 may determine a particular URI, such as a deep link, for a particular application from among the candidate applications and provide information to the execution engine 265 that identifies the particular URI to execute or application to execute. For example, the ranking engine 255 may receive information identifying two candidate applications with respective deep links that have been identified based on the transcription "Call taxi." One candidate deep link may specify the "Cab Called" taxi service application and the second deep link may specify a taxi service application called "TaxiNow." The ranking engine 255 may rank the "Cab Caller" taxi service application over the "TaxiNow" taxi service application, based on a product of the power score, bidding weight and feedback score, and so may select the candidate deep link that specifies the "Cab Caller" application from among the two candidate applications. The ranking engine 255 may then transmit information to the execution engine 265 that identifies the deep link that specifies the "Cab Caller" application for execution. In this way, the ranking engine 255 may use ranking metrics to select a particular candidate application that has a URI corresponding to the user's command, without requiring additional input from the user 210.

The execution engine 265 may receive information identifying a particular application from the ranking engine 255 and may execute the URI, such as the deep link, associated with the particular application that corresponds to the keyword to cause an activity specified by the keyword from the user's command to be performed on or by the specified application. For example, the execution engine 265 may execute the deep link to cause the activity to be performed on the specified application, may provide control to an operating system or other application to perform the activity on the application, or may cause the application to perform the specified activity. In other examples, the execution engine 265 may provide information to the client device 220 that identifies the application to execute or an activity specified by the URI to execute, and the client device 220 may receive the information and execute the URI or the activity based on the received information. In some instances, the execution engine 265 may be implemented at the client device 220.

As an example, based on receiving information from the ranking engine 255 that identifies the candidate URI that specifies the "Cab Caller" application, the execution engine 265 may execute the URI that specifies the "Cab Caller" application. Executing the URI that specifies the "Cab Caller" application may involve determining an activity specified by the URI, such as an activity that launches the "Cab Caller" application or a particular page, user interface, or feature of the "Cab Caller" application, or the like. In some implementations, based on determining that the activity specified by the URI is an activity to launch the "Cab Caller" application, the execution engine 265 may transmit information that causes the client device 220, or an application, operating system, or other software hosted on the client device 220 to launch the "Cab Caller" application or a particular page, user interface, or feature of the "Cab Caller" application, or the like, on the client device 220.

In some instances, executing the URI may involve transmitting the URI or information associated with the URI without determining the activity or action specified by the URI. For example, the execution engine 265 may transmit data associated with the identified URI to the client device 220 without determining an activity or action specified by the URI. In such a case, the client device 220, or an application, operating system, or other software hosted by the client device 220 may determine the activity or action to perform based on the URI, and may cause the activity or action to be performed on or by the particular application specified in the URI.

The client device 220 may receive information from the execution engine 265, and based on the information, may perform operations to carry out the activity or action specified by the identified URI. For example, the client device 220 may receive the URI identified by the ranking engine 255 or may receive information instructing the client device 220 or software hosted by the client device 220 to carry out the activity or action specified by the identified URI, such as an activity to launch the "Cab Caller" application or a particular page, user interface, or feature of the "Cab Caller" application, or the like. Based on the received information the client device 220 or software hosted by the client device 220 may perform the activity or action. For example, an operating system of the client device 220, the "Cab Caller" application itself, or another application hosted on the client device 220 may launch the "Cab Caller" application in response to the received information. In this way, the "Call taxi" voice input provided by the user 210 may cause the launching of the "Cab Caller" taxi service application, such that the user 210 would then be able to request a taxi using the "Cab Caller" application, without requiring additional input from the user 210 selection the "Cab Caller" application.

Figure 3A:
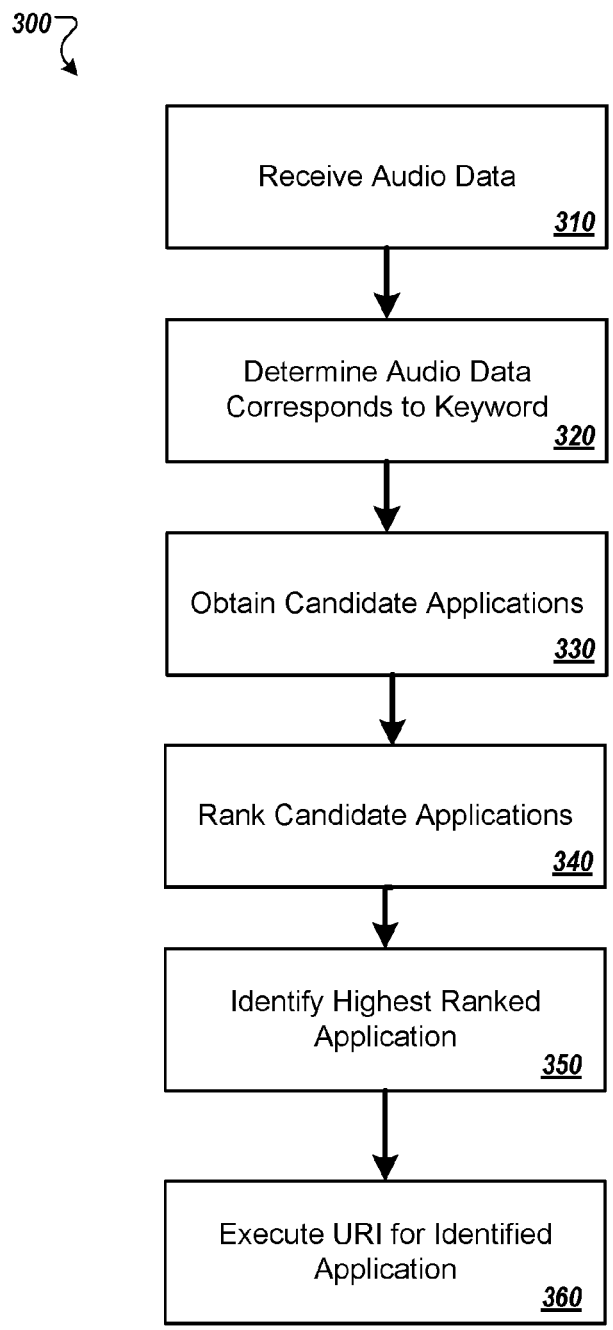
FIG. 3A depicts an example flowchart for recognizing a keyword and executing an application, according to certain implementations.

FIG. 3A depicts an example flowchart of a process 300 for recognizing a keyword and executing an application, according to certain implementations. At 310, audio data corresponding to an utterance of a user may be received. A determination that at least a portion of the audio data corresponds to an action keyword may be made at 320. The action keyword may correspond to an action to be performed by a device associated with the user.

At 330, candidate applications that correspond to the action keyword may be obtained. The candidate applications that correspond to the action keyword may include applications associated with a URI that corresponds to the action keyword. At 340, the candidate applications that correspond to the action keyword may be ranked based at least on a bidding weight associated with the action keyword for each of the candidate applications, and a power score associated with each of the candidate applications. In certain implementations, the candidate applications may also be ranked in accordance with a feedback score associated with the URI that corresponds to the action keyword. A highest ranked application among the candidate applications that has a URI that corresponds to at least the action keyword may be identified at 350. For example, the application corresponding to the highest ranked URI may be identified or the highest ranked application with a URI associated with the action keyword may be identified. At 360, the URI for the highest ranked application among the candidate applications that correspond to at least the action keyword may be executed.

In certain implementations, a determination that at least a portion of the audio data corresponds to an object keyword may be made. The object keyword may correspond to an object of the action to be performed by the device associated with the user. In certain implementations, candidate applications that correspond to a combination of the action keyword and the object keyword may be obtained. The candidate applications that correspond to the combination of the action keyword and the object keyword may include applications associated with a URI that corresponds to the combination of the action keyword and the object keyword. Ranking the candidate applications may include ranking the candidate applications that correspond to the combination of the action keyword and the object keyword based at least on a bidding weight associated with the combination of the action keyword and the object keyword for each of the candidate applications, and a power score associated with each of the candidate applications. In addition, a highest ranked application among the candidate applications that has a URI that corresponds to the combination of the action keyword and the object keyword may be identified. The URI for the highest ranked application among the candidate applications that correspond to the combination of the action keyword and the object keyword may be executed.

In certain implementations, at least one application, among the candidate applications, that is not installed on the device associated with the user may be determined. The at least one application that is determined to not be installed on the device associated with the user may be removed from the obtained candidate applications. In certain implementations, ranking the candidate applications that correspond to the action keyword includes determining a ranking score for each of the candidate applications, the ranking score being determined as a product of the bidding weight associated with the action keyword for each of the candidate applications, the power score associated with each of the candidate applications, and the feedback score for each URI that corresponds to the action keyword.

Figure 3B:
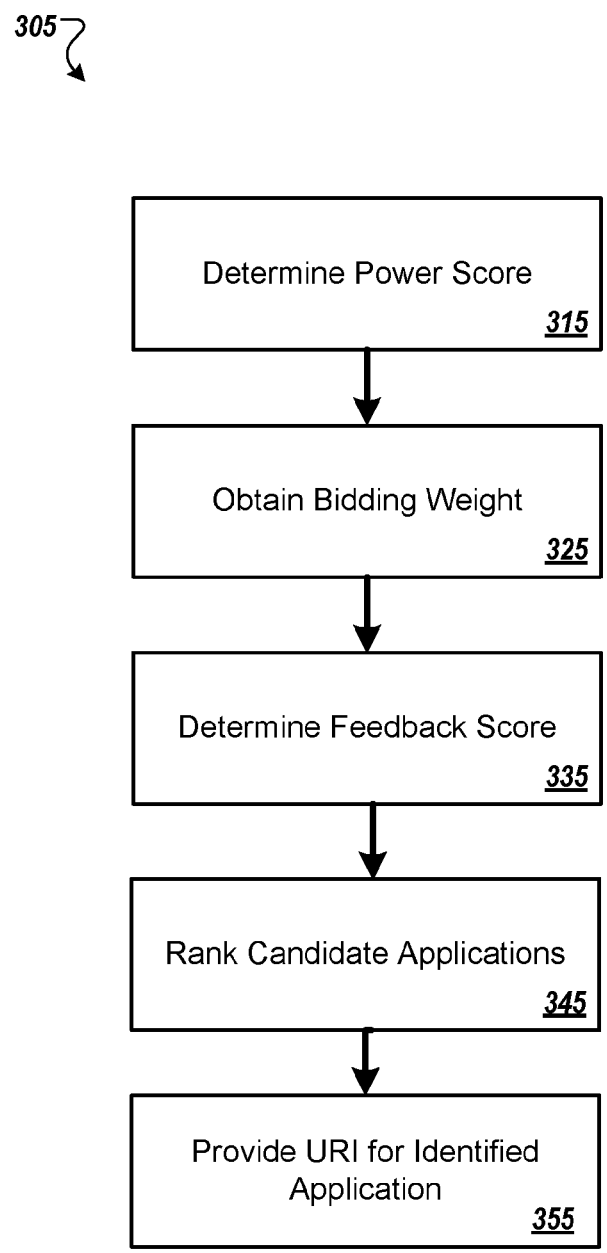
FIG. 3B depicts an example flowchart for ranking candidate applications and executing an application, according to certain implementations.

FIG. 3B depicts an example flowchart of a process 305 for ranking candidate applications and executing an application, according to certain implementations. For each of multiple candidate applications a power score may be determined, at 315, based at least on a popularity metric and a rating associated with the application. The popularity metric may be based on a number of downloads, a frequency of use, a user rating, a number of user reviews, a number of search queries, a number of downloads in a given time period, or the like, or any combination thereof. At 325, a bidding weight associated with an action keyword and a URI corresponding to the action keyword for the application may be obtained. The action keyword may correspond to an action to be performed by a client device. At 335, a feedback score may be determined for each URI corresponding to the action keyword for the application. The candidate applications may be ranked, at 345, in accordance with the ranking of the respective URIs associated with the candidate applications that correspond to the action keyword based at least on the power score, the bidding weight, and the feedback score. For example, a ranking score may be determined as a product of the power score, the bidding weight, and the feedback score for a given URI associated with the action keyword for the candidate applications. At 355, the URI for a highest ranked application among the candidate applications that corresponds to the action keyword may be provided for execution. Thus, a ranking of candidate applications may be generated in accordance with the ranking of the respective URIs associated with the candidate applications and the URI for a highest ranked application among the candidate applications that corresponds to the action keyword may be provided for execution.

Figure 4:
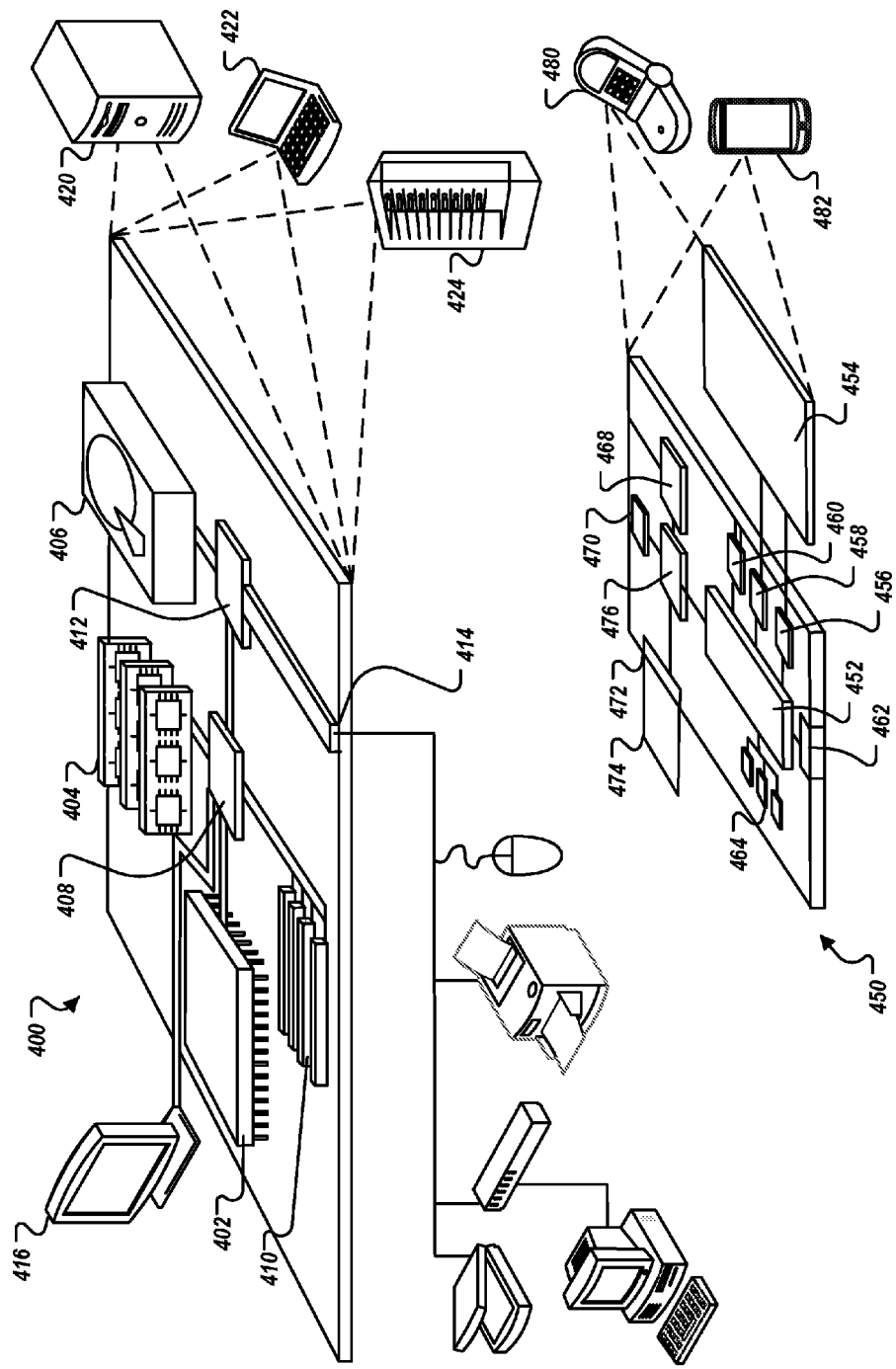
FIG. 4 depicts a computer device and a mobile computer device that may be used to implement the techniques described here.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, or a memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 may execute instructions within the computing device 640, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 648 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 may be implemented as one or more of a computer-readable medium or media, a volatile memory unit or units, or a non-volatile memory unit or units. Expansion memory 454 may also be provided and connected to device 450 through expansion interface 452, which may include, for example, a SIMM (Single In Line Memory Module) card interface. Such expansion memory 454 may provide extra storage space for device 450, or may also store applications or other information for device 450. Specifically, expansion memory 454 may include instructions to carry out or supplement the processes described above, and may include secure information also. Thus, for example, expansion memory 454 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 454, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 450 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Implementations of the invention and all of the functional operations described in this specification can be implemented in digital electronic circuitry, or in computer software, firmware, or hardware, including the structures disclosed in this specification and their structural equivalents, or in combinations of one or more of them. Implementations of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:
   receiving audio data corresponding to an utterance of a user;
   determining that at least a portion of the audio data corresponds to an action keyword, the action keyword corresponding to an action to be performed by a device associated with the user;
   identifying candidate applications that correspond to the action keyword, the candidate applications that correspond to the action keyword comprising applications associated with a uniform resource identifier (URI) that corresponds to the action keyword;
   selecting a candidate application, from the identified candidate applications that correspond to the action keyword, based at least on: (i) a bidding weight associated with the action keyword for each of the candidate applications, and (ii) a power score associated with each of the candidate applications that is determined based at least on a popularity metric and a rating associated with each of the candidate applications,
   wherein the bidding weight associated with the action keyword for each of the candidate applications is normalized for each of the candidate applications to generate a normalized bidding weight associated with the action keyword for each of the candidate applications; and
   executing the URI for the selected candidate application.

2. The computer-implemented method of claim 1, further comprising:
   determining that at least a portion of the audio data corresponds to an object keyword, the object keyword corresponding to an object of the action to be performed by the device associated with the user; and
   identifying candidate applications that correspond to a combination of the action keyword and the object keyword, the candidate applications that correspond to the combination of the action keyword and the object keyword comprising applications associated with a URI that corresponds to the combination of the action keyword and the object keyword,
   wherein selecting a candidate application comprises selecting the candidate application, from the identified candidate applications that correspond to a combination of the action keyword and the object keyword, based at least on: (i) a bidding weight associated with the combination of the action keyword and the object keyword for each of the candidate applications, and (ii) a power score associated with each of the candidate applications, and
   wherein executing the URI for the selected candidate application comprises executing the URI for the selected candidate application among the identified candidate applications that correspond to the combination of the action keyword and the object keyword.

3. The computer-implemented method of claim 1, further comprising:
   determining at least one application, among the candidate applications, that is not installed on the device associated with the user; and
   removing the at least one application that is determined to not be installed on the device associated with the user from the identified candidate applications.

4. The computer-implemented method of claim 1, wherein the bidding weight associated with the action keyword for each of the candidate applications is obtained from metadata associated with the application.

5. The computer-implemented method of claim 1, wherein the popularity metric is based on at least one of: a number of downloads, a frequency of use, a user rating, a number of user reviews, a number of search queries, and a number of downloads in a given time period.

6. A computer-implemented method comprising:
   receiving audio data corresponding to an utterance of a user;
   determining that at least a portion of the audio data corresponds to an action keyword, the action keyword corresponding to an action to be performed by a device associated with the user;

identifying candidate applications that correspond to the action keyword, the candidate applications that correspond to the action keyword comprising applications associated with a uniform resource identifier (URI) that corresponds to the action keyword;

selecting a candidate application, from the identified candidate applications that correspond to the action keyword, based at least on: (i) a bidding weight associated with the action keyword for each of the candidate applications, and (ii) a power score associated with each of the candidate applications that is determined based at least on a popularity metric and a rating associated with each of the candidate applications, wherein selecting the candidate application, from the identified candidate applications that correspond to the action keyword, comprises:

determining a ranking score for each of the candidate applications, the ranking score being determined based at least on the bidding weight associated with the action keyword for each of the candidate applications, the power score associated with each of the candidate applications, and a feedback score for each URI that corresponds to the action keyword, the feedback score being determined for each URI based at least on a user action associated with the URI;

identifying a highest ranked application among the candidate applications that has a URI that corresponds to at least the action keyword; and executing the URI for the highest ranked application.

7. A system comprising one or more processors and one or more storage devices storing instructions that are operable, when executed by the one or more processors, to cause the one or more processors to perform operations comprising:

receiving audio data corresponding to an utterance of a user;

determining that at least a portion of the audio data corresponds to an action keyword, the action keyword corresponding to an action to be performed by a device associated with the user;

identifying candidate applications that correspond to the action keyword, the candidate applications that correspond to the action keyword comprising applications associated with a uniform resource identifier (URI) that corresponds to the action keyword;

selecting a candidate application, from the identified candidate applications that correspond to the action keyword, based at least on: (i) a bidding weight associated with the action keyword for each of the candidate applications, and (ii) a power score associated with each of the candidate applications that is determined based at least on a popularity metric and a rating associated with each of the candidate applications, wherein the bidding weight associated with the action keyword for each of the candidate applications is normalized for each of the candidate applications to generate a normalized bidding weight associated with the action keyword for each of the candidate applications; and executing the URI for the selected candidate application.

8. The system of claim 7, wherein the operations comprise:

determining that at least a portion of the audio data corresponds to an object keyword, the object keyword corresponding to an object of the action to be performed by the device associated with the user; and identifying candidate applications that correspond to a combination of the action keyword and the object keyword, the candidate applications that correspond to the combination of the action keyword and the object keyword comprising applications associated with a URI that corresponds to the combination of the action keyword and the object keyword, wherein selecting a candidate application comprises selecting the candidate application, from the identified candidate applications that correspond to a combination of the action keyword and the object keyword, based at least on: (i) a bidding weight associated with the combination of the action keyword and the object keyword for each of the candidate applications, and (ii) a power score associated with each of the candidate applications, and wherein executing the URI for the selected candidate application comprises executing the URI for the selected candidate application among the identified candidate applications that correspond to the combination of the action keyword and the object keyword.

9. The system of claim 7, wherein the operations comprise:

determining at least one application, among the candidate applications, that is not installed on the device associated with the user; and removing the at least one application that is determined to not be installed on the device associated with the user from the identified candidate applications.

10. The system of claim 7, wherein the bidding weight associated with the action keyword for each of the candidate applications is obtained from metadata associated with the application.

11. The system of claim 7, wherein the popularity metric is based on at least one of: a number of downloads, a frequency of use, a user rating, a number of user reviews, a number of search queries, and a number of downloads in a given time period.

12. The system of claim 7, wherein selecting the candidate application, from the identified candidate applications that correspond to the action keyword, is further based at least on a feedback score for each URI that corresponds to the action keyword, the feedback score being determined for each URI based at least on a user action associated with the URI.

13. The system of claim 12, wherein selecting the candidate application, from the identified candidate applications that correspond to the action keyword, comprises:

determining a ranking score for each of the candidate applications, the ranking score being determined as a product of the bidding weight associated with the action keyword for each of the candidate applications, the power score associated with each of the candidate applications, and the feedback score for each URI that corresponds to the action keyword; and identifying a highest ranked application among the candidate applications that has a URI that corresponds to at least the action keyword.

14. The computer-implemented method of claim 6, further comprising:

determining at least one application, among the candidate applications, that is not installed on the device associated with the user; and removing the at least one application that is determined to not be installed on the device associated with the user from the identified candidate applications.

15. The computer-implemented method of claim 6, wherein the bidding weight associated with the action keyword for each of the candidate applications is obtained from metadata associated with the application.

16. The computer-implemented method of claim 6, wherein the popularity metric is based on at least one of: a number of downloads, a frequency of use, a user rating, a number of user reviews, a number of search queries, and a number of downloads in a given time period.

17. The computer-implemented method of claim 6, wherein the bidding weight associated with the action keyword for each of the candidate applications is normalized for each of the candidate applications to generate a normalized bidding weight associated with the action keyword for each of the candidate applications.

* * * * *